Sept. 15, 1970  G. MAY  3,528,474
TUBELESS TIRE INFLATOR
Filed April 19, 1968  2 Sheets-Sheet 1
FIG_1
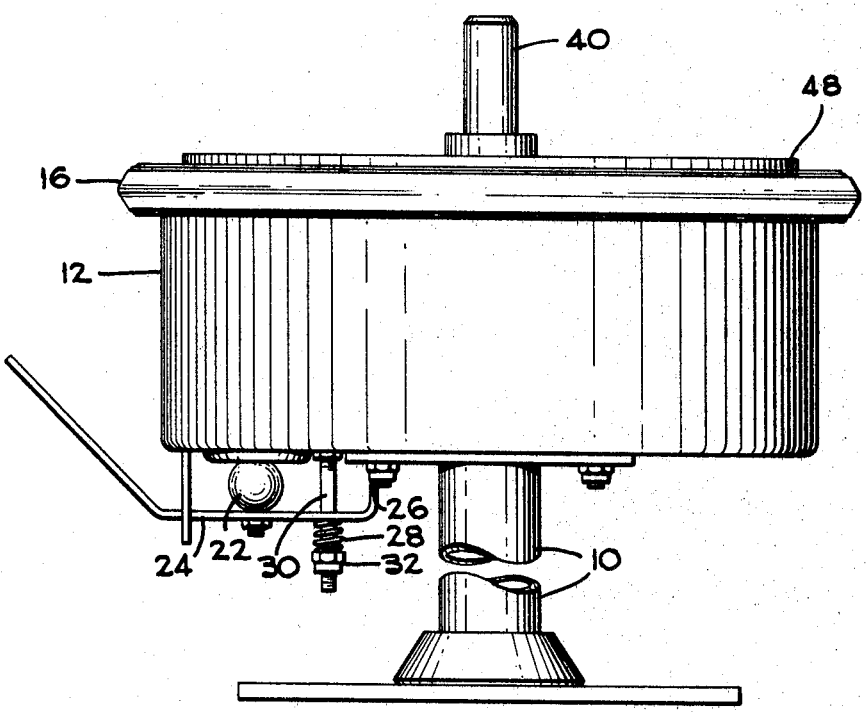
FIG_2
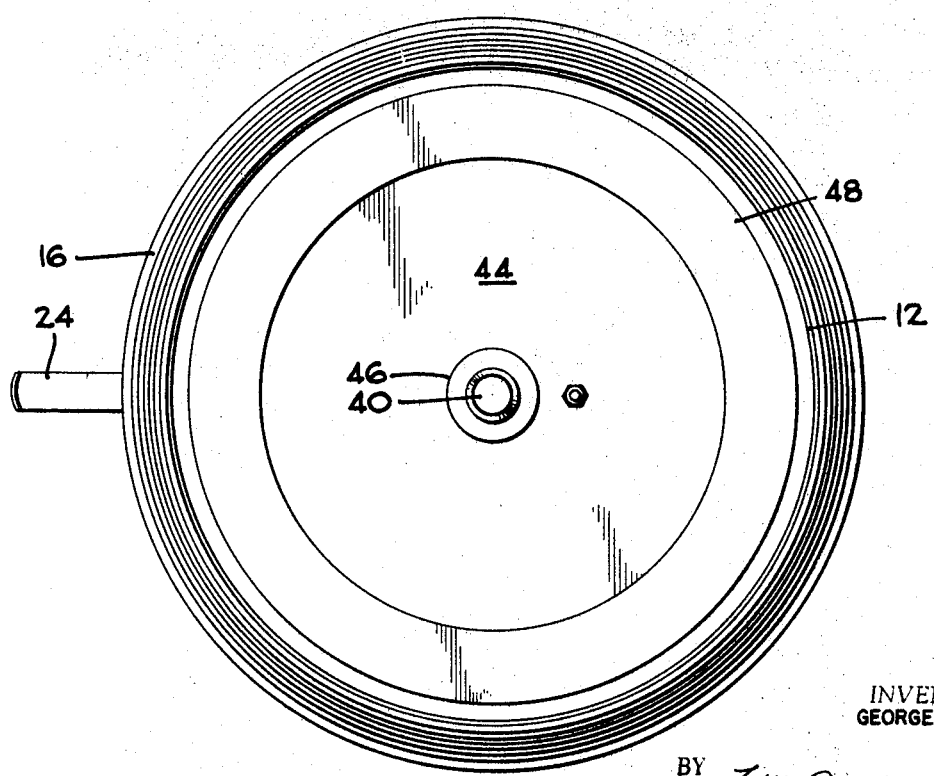
INVENTOR.
GEORGE MAY
BY F.W. Anderson
C.C. Tripp
ATTORNEYS Sept. 15, 1970  G. MAY  3,528,474
TUBELESS TIRE INFLATOR
Filed April 19, 1968  2 Sheets-Sheet 2
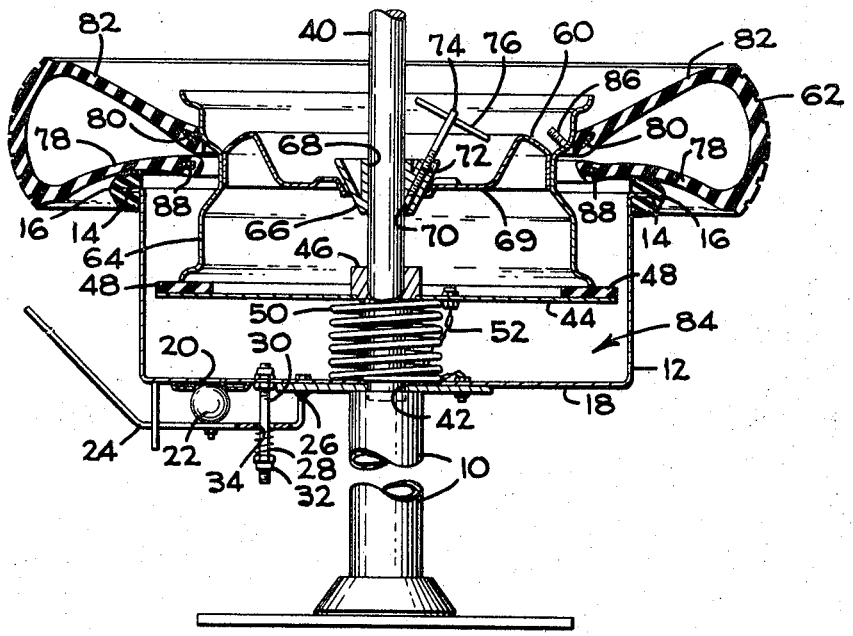
FIG_3
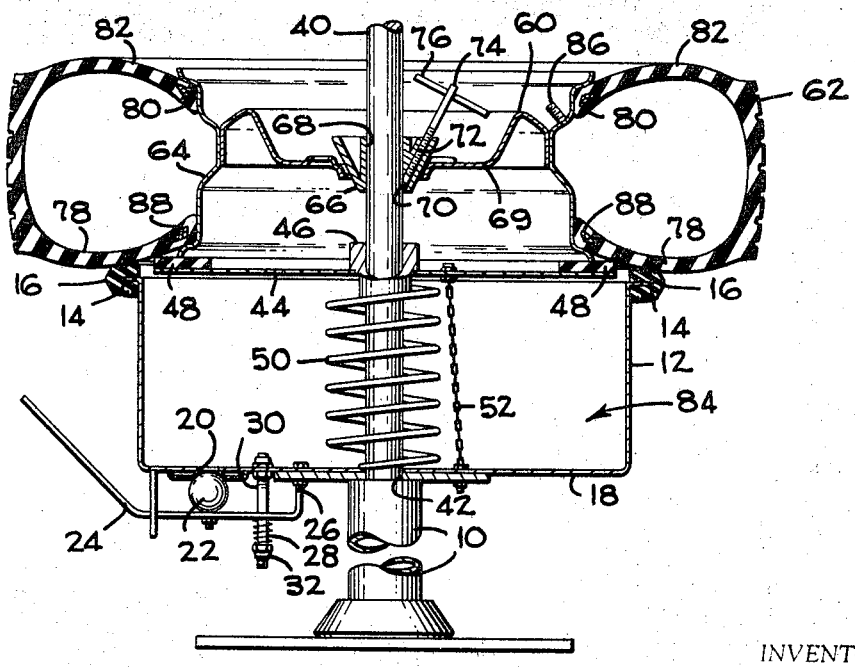
FIG_4
INVENTOR.
GEORGE MAY
BY F.W. Anderson
C.E. Tripp
ATTORNEYS

United States Patent Office 3,528,474
Patented Sept. 15, 1970

3,528,474
TUBELESS TIRE INFLATOR
George May, Lansing, Mich., assignor to FMC Corporation, San Jose, Calif., a corporation of Delaware
Filed Apr. 19, 1968, Ser. No. 722,725
Int. Cl. B60c 25/06
U.S. Cl. 157—1.1          10 Claims

ABSTRACT OF THE DISCLOSURE

Apparatus for inflating tubeless tires has a cylindrical container with a central upstanding shaft. A platform is slidably received on the shaft above a spring to hold a wheel with a deflated tire on the rim thereof. The weight of the wheel lowers the platform by compression of the spring to engage the lower wall of the tire with the lip of the container and to engage the upper wall of the tire with the rim of the wheel. The tire, container, platform and rim define a closed chamber which is expanded when air is introduced through a valve in the rim to raise the platform and engage the lower wall of the tire with the rim.

BACKGROUND OF THE INVENTION

The present invention relates to apparatus for inflating tubeless tires.

In a typical tubeless tire inflator, the bead on one wall of the deflated tire is initially engaged with the rim of the wheel. A closed chamber is formed to include the bead on the other wall of the tire and the rim so that when air is introduced into this chamber, as through a valve in the rim, the air will expand and spread the tire until both beads are firmly seated on the rim. With one bead of the tire initially engaged with the rim, the pressure introduced to the chamber must effect relative movement between the rim and the other bead of the tire to seat the beads on the rim. In some tubeless tire inflators, the air pressure introduced to the tire spreads the walls of the tire and lifts the wheel to effect sealing engagement with the rim. When the tire must lift the wheel, a relatively high pressure must be reached in the chamber before the tire beads will seat on the rim.

SUMMARY OF THE INVENTION

In the present invention, a tubeless tire inflator is provided in which a relatively low pressure will effect movement between the tire and the wheel rim to seat the beads of the tire on the rim. In the preferred embodiment of the invention, the wheel seats on a platform which is movable vertically on a post into and out of a cylindrical container. The platform is supported by a spring which is compressed by the weight of a wheel received thereon to lower the platform and wheel into the container. A deflated tire received over the rim is too large to fit into the container and the lower wall of the tire engages the lip surrounding the upper open end of the container. With the platform depressed by the weight of the wheel and the tire sustained by the container, the bead on the upper wall of the tire is forced into sealing engagement with the rim of the wheel. Thus, at this time, the tire, the rim, the platform, and the container define a closed chamber to which air is added through a valve in the rim. The bottom of the container and the platform form two parallel walls of the chamber and, as the pressure in the chamber begins to rise on the addition of air to the chamber, the platform rises in the container to raise the wheel thereon. A low pressure will exert a relatively large force against the bottom of the platform, which is of larger diameter than the wheel. This large force quickly and easily raises the platform to bring the rim of the wheel into sealing engagement with the bead on the lower wall of the tire. Thus, in addition to any tendency for the tire to lift the wheel as the walls of the tire spread, there is a force applied to the platform to lift the platform and the wheel thereon. This latter force minimizes any tendency for the former force to lift the wheel off the platform.

It is therefore one object of the present invention to inflate a tubeless tire on a wheel with relatively low pressure. It is another object of the present invention to provide an improved tubeless tire inflator for quick, easy tubeless tire mounting with low pressure.

BRIEF DESCRIPTION OF THE DRAWINGS

FIG. 1 is a side elevational view of the tubeless tire inflator of the present invention;

FIG. 2 is a plan view of the apparatus shown in FIG. 1;

FIG. 3 is a cross-sectional view, taken as the view of FIG. 1, showing the apparatus of FIG. 1 with a wheel and deflated tire mounted thereon; and FIG. 4 is a view similar to FIG. 3 except that the tire has been inflated.

DESCRIPTION OF THE PREFERRED EMBODIMENT

There is shown in the drawings a tubeless tire inflator having an upstanding vertical standard 10 to which a cylindrical tank, or container 12 is connected. Container 12 is closed at the bottom but is open at the top. The upper edge of the container 12 is bent outwardly to define a flange 14 which receives an annular rubber lip member 16. The bottom wall 18 of the container has an opening 20 therein which is normally sealed by ball 22. Ball 22 is mounted outside the container on strap 24 which is secured at 26 to the bottom of container wall 18. Strap 24 is normally urged upwardly by spring 28 which is received on a stud 30 and held thereon by nut 32. Stud 30, which is secured to the bottom of container wall 18, extends through a hole 34 in strap 24. Depression of the outer end of strap 24 will lower ball 22 to open opening 20. On release of the outer end of strap 24, spring 28 will raise ball 22 to close the opening 20.

An upstanding vertical shaft 40 is mounted in standard 10 and extends through an opening 42 is container wall 18. Shaft 40 extends upwardly out of the container in centered relation thereto. A platform 44 has a central hub 46 which is slidably received on shaft 40. An annular gasket 48 is mounted on the upper side of platform 44 and extends around the periphery thereof. A spring 50 is mounted on the shaft 40 between container wall 18 and platform 44 to support the platform. A chain 52, connected between container wall 18 and platform 44, limits the upward movement of platform 44.

In using the apparatus, a wheel 60 is placed on the gasket 48 of the platform 44. A deflated tire 62 is mounted over the rim 64 of the wheel, as shown in FIG. 3. A holddown cone 66, having a central bore 68 extending through the body thereof, is then placed on the shaft 40 over the wheel and in engagement with the web 69 of the wheel. The holddown cone has a Teflon friction button 70 received in bore 72 of the body of the cone. The button 70 is mounted on the end of a shaft 74 threadedly engaged in bore 72. A handle 76 on the outer end of shaft 74 permits the operator to screw shaft 74 into bore 72 to urge the friction button 70 against shaft 40. At this time, strap 24 is depressed to open opening 20 and the holddown cone, which is loose on shaft 40, is pushed down to lower platform 44 and the wheel 60 thereon into the container. The tire 60 is larger in diameter than the container and the lower side wall 78 thereof engages the upper side of the rubber lip 16. The wheel is lowered by pushing on the holddown cone until the bead 80 on the upper side wall 82 firmly engages the rim 64. The handle 76 is then turned to screw the friction button against shaft 40 with sufficient snugness to hold the platform 44 in position, against the force of spring 50, on the shaft 40 without locking the cone to the shaft. Strap 24 is then released to allow ball 22 to close opening 20.

At this time, a closed chamber 84 is defined by the container 12, platform 44 (which has no openings therein), rim 64, and deflated tire 62, which is in sealing engagement with both the rim 64 and container 12. In other words, the platform, rim, and tire define a closure for the container when one wall of the tire is engaged with the lip of the container and the other wall of the tire is engaged with the rim of the wheel. Air is then introduced into chamber 84 by means of valve 86 mounted on the rim of the wheel. As air enters chamber 84 to raise the pressure therein above atmospheric pressure, the side walls of the tire tend to spread to urge the wheel upward. It should be noted, however, that as pressure in the chamber 84 increases, a pressure differential developes across platform 44, the upper surface of which is at atmospheric pressure and the lower surface of which is at the pressure of the chamber. This pressure differential, even when small, exerts a significant upward force on platform 44 because of the large area of platform 44 which has a diameter larger than the diameter of the wheel. This significant upward force exerted by the pressure differential across the platform, coupled with the force exerted between the container and the rim by the spreading of the sidewalls of the tire, force the platform and wheel upward, against the retarding friction force of button 70, until the bead 88 of lower sidewall 78 firmly seats on rim 64, as shown in FIG. 4.

Thus, the chamber 84 is expanded by the introduction of air thereto, and platform 44 is raised by this expansion, separating from container wall 18, to materially assist in lifting the wheel 60 into sealing engagement with the lower side wall of the tire. Although the spreading of the sidewalls of the tire exert an upward force on the wheel, there is no tendency for this force to lift the wheel off the platform because the platform is itself lifted by expansion of the chamber.

Although the best mode contemplated for carrying out the present invention has been herein shown and described, it will be apparent that modification and variation may be made without departing from what is regarded to be the subject matter of the invention as set forth in the appended claims.

I claim:

1. A device to support a wheel for mounting and inflating a tubeless tire on the rim of said wheel comprising a container having a closed end and an open end, a platform to receive a wheel, said platform sealing one side of the rim of the wheel thereon and said platform movable into the container to effect engagement of the open end of the container with one wall of a tire received over the rim of the wheel, said platform and container permitting the passage of air between the rim of the wheel and the interior of the container beyond the platform, the platform, rim, and tire defining a closure for the open end of the container when the other wall of the tire is engaged with the rim, means to introduce air through the rim to said container and past said platform, and means mounting said platform for movement out of said container as air passes the platform into the closed end of the container to bring the rim into engagement with said one wall of the tire.

2. A device to support a wheel for mounting and inflating a tubeless tire on the rim of said wheel comprising an enclosed container having an opening at one end, a platform mounted in the container to receive a wheel thereon with a deflated tire around the rim thereof, said platform and container permitting the passage of air in the container past the platform and beyond the rim of the wheel, said container, platform, rim, and tire defining a closed chamber when one wall of the tire is engaged with the rim and the other wall of the tire is engaged with the container at the opening, and means to introduce air through the rim into said chamber for dispersion past the platform to expand the chamber by separating movement between the platform and the container, said movement bringing said other wall of the tire into engagement with the rim.

3. A device to support a wheel for mounting and inflating a tubeless tire on the rim of said wheel comprising an enclosed container having an upper opening, a lip surrounding said opening, a vertically movable platform mounted in the container to receive a wheel thereon with a deflated tire around the rim thereof, said platform yieldable into the container to bring the lower wall of the tire into engagement with said lip and to bring the upper wall of the tire into engagement with said rim to define a closed chamber comprising the container, platform, rim, and tire, said platform and container permitting the passage of air past the platform, means to introduce air into the upper portion of said chamber for transmission past said platform into the portion of the chamber below the platform to expand the chamber and raise the platform for elevation of the rim into engagement with the lower wall of the tire.

4. A device to support a wheel for mounting and inflating a tubeless tire on the rim of said wheel comprising a container having a closed bottom and a closed side wall, said container having an upper circular opening, a circular lip surrounding said opening, a vertical shaft in said container, said shaft centered with respect to said opening and said lip, a platform mounted on said shaft to receive a wheel with a deflated tire around the rim thereof, said platform yieldable to sink into the container under the weight of a wheel and tire thereon to bring the lower wall of the tire into engagement with the lip and to bring the upper wall of the tire into engagement with the rim, said platform moving in spaced relation to the side wall, the container, platform, tire, and rim defining a closed chamber when the walls of the tire are engaged, respectively, with the lip and the rim, and means to introduce air into said chamber and under the platform to expand the chamber and elevate the platform, the elevation of the platform bringing the lower wall of the tire into engagement with the rim.

5. The device of claim 4 including a friction member slidably mounted on the shaft over the wheel to retard the elevational movement of the platform when air is introduced into said chamber.

6. The device of claim 5 in which said friction member is adjustable for varying the retarding force exerted thereby.

7. The device of claim 4 including a spring mounted on the shaft between the bottom of the container and the platform to support the platform.

8. The device of claim 4 including a valve in communication with said chamber to relieve the pressure therein.

9. The device of claim 4 including means to arrest the upward movement of the platform.

10. A device to support a wheel for mounting and inflating a tubeless tire on the rim of said wheel said rim having a valve therein, the combination comprising a container having an upper circular opening, a circular lip surrounding said opening, a vertical shaft extending upwardly from the bottom of the container out through said opening in centered relation to the opening and the lip surrounding the opening, a platform mounted on said shaft to receive a wheel with a deflated tire around the rim thereof, a spring mounted on said shaft between the bottom of the container and the platform to support the platform, said platform yieldable against the force of the spring to sink into the container under the weight of a wheel and tire thereon to bring the lower wall of the tire into engagement with the lip and to bring the upper wall of the tire into engagement with the rim, said container, platform, tire, and rim defining a closed chamber when the walls of the tire are engaged, respectively, with the lip and the rim, said chamber expanding when air is introduced through the valve in the rim to elevate the platform and bring the lower wall of the tire into engagement with the rim, an adjustable friction element comprising a body and a threaded element received therein on the shaft over the wheel to exert a selected retarding force on the wheel and platform, means to limit the upward movement of the platform, and means selectively to release air from the chamber.

References Cited

UNITED STATES PATENTS

| | | | |
|---|---|---|---|
| 2,874,760 | 2/1959 | Bishop | 157—1.1 |
| 2,900,015 | 8/1959 | Harrison | 157—1.1 |
| 2,910,117 | 10/1959 | Lamerson | 157—1.1 |
| 2,936,827 | 5/1960 | Riggs | 157—1.1 |

GRANVILLE Y. CUSTER, JR., Primary Examiner